United States Patent [19]

Grieb et al.

[11] Patent Number: 6,072,296
[45] Date of Patent: Jun. 6, 2000

[54] ASYNCHRONOUS MOTOR FOR A DRIVE MECHANISM, SUCH AS HOISTS OR RUNNING GEARS, WITH CONTROLLABLE ROTATIONAL SPEED AND ROTATIONAL DIRECTION

[75] Inventors: Eckerhardt Grieb, Hagen; Wolfgang Krebs, Wetter; Anton Müller, Wetter; Giuliano Persico, Wetter; Gerhard Weber, Breckerfeld, all of Germany

[73] Assignee: Mannesmann AG, Düsseldorf, Germany

[21] Appl. No.: 09/290,802

[22] Filed: Apr. 13, 1999

[30] Foreign Application Priority Data

May 14, 1998 [DE] Germany .......................... 198 23 379

[51] Int. Cl.⁷ ................................................ G05B 19/29
[52] U.S. Cl. ........................................... 318/602; 318/727
[58] Field of Search .................................... 318/640, 727, 318/602

[56] References Cited

U.S. PATENT DOCUMENTS

| | | | |
|---|---|---|---|
| 3,772,579 | 11/1973 | Stone et al. | 318/203 R |
| 4,491,753 | 1/1985 | Kamatani | 310/77 |
| 4,644,157 | 2/1987 | Ozaawa et al. | |
| 4,864,125 | 9/1989 | Minami et al. | 250/231 E |
| 5,285,125 | 2/1994 | Lang | 310/240 |
| 5,502,362 | 3/1996 | Brandes | 318/471 |
| 5,638,387 | 6/1997 | Palleggi et al. | 318/67 |
| 5,714,811 | 2/1998 | Jung | 310/68 B |

FOREIGN PATENT DOCUMENTS

| | | |
|---|---|---|
| 21 50 951 | 4/1973 | Germany . |
| 244 206 A1 | 3/1987 | Germany . |
| 39 10 1498 A1 | 10/1990 | Germany . |

OTHER PUBLICATIONS

Publication: "Betriebsanleitung Einbau–Impulsgeber EG" (Operating Manual for Built–in Pulse Transmitter EG) by Mannesmann Demag För dertechnik AG p. 2–11.
Publication: Einbau–Impulsgeber EG, Digitale Informationstechnik für Bremsmotoren by Mannesmann Demag Fördertechnik AG, p. 2–4.
IBM Technical Disclosure Bulletin, vol. 17, No. 2, Jul. 1974, p. 357–358.

*Primary Examiner*—Karen Masih
*Assistant Examiner*—Rina I. Duda
*Attorney, Agent, or Firm*—Henry M. Feiereisen

[57] ABSTRACT

An asynchronous motor for a drive mechanism, in particular a hoist or a running gear includes a motor housing with opposite end faces covered by respective end shields, and an annular short-circuit winding disposed on a motor shaft. An asynchronous motor of this type is compact and inexpensive to manufacture and can be reliably controlled even in the presence of a rear-mounted magnetic brake, by accommodating in the motor housing at least two sensor units which are arranged sequentially in the direction of rotation of the motor at the rear of the motor housing, with each sensor unit including an opto-electronic receiver and a confronting electro-optic transmitter. Secured in the motor housing on the motor shaft between the short-circuit winding and the rear end shield is a circular rotary disk which includes modulation elements for interaction with the sensor units, by modulating the intensity of optical output signals produced by the electro-optic transmitter when the modulation elements pass by the respective sensor unit. The associated receiver transforms the modulated intensity of the optical output signals for formation of at least one electric motor control signal.

17 Claims, 5 Drawing Sheets

ASYNCHRONOUS MOTOR FOR A DRIVE MECHANISM, SUCH AS HOISTS OR RUNNING GEARS, WITH CONTROLLABLE ROTATIONAL SPEED AND ROTATIONAL DIRECTION

CROSS-REFERENCES TO RELATED APPLICATIONS

This application claims the priority of German Patent Application Serial No. 198 23 379.5, filed May 14, 1998, the subject matter of which is incorporated herein by reference.

BACKGROUND OF THE INVENTION

The present invention relates, in general, to an asynchronous motor for a driving mechanism, especially for a hoist or running gear, and more particularly to an asynchronous motor with controllable rotational speed and direction of rotation.

The publication, entitled "Betriebsanleitung Einbau-lmpulsgeber EG" (*Operating Manual for Built-in Pulse Transmitter EG*) by Mannesmann Demag Fordertechnik AG, describes a sliding rotor asynchronous motor with a mechanical brake for controlled drive mechanisms, in particular hoists or running gears. The described motor is arranged in a motor housing, with both end faces being closed off by an end shield that forms a cover. The asynchronous motor includes a rotary disk arranged on the rearward side of the motor shaft opposite the output side. The rotary disk is provided with individual magnets arranged on the marginal region of the disk at a constant angular separation from each other and at the same radial distance from the motor shaft. Hall sensors facing the magnets are arranged at a same level as the magnets. During each cycle the rotary disk rotates, the Hall sensors are passed successively by the individual modulation elements so as to produce at the output of the Hall sensors an alternating signal that is a function of the rotational angle. The rotational speed of the electric motor can be determined from the alternating signal, which makes it possible to control or regulate the rotational speed of the asynchronous motor. A second Hall sensor is provided to detect the rotational direction, with the second Hall sensor being arranged—as viewed in the rotational direction—behind the first Hall sensors at a same level as the first Hall sensors. The phase of the two Hall sensors is shifted with respect to one another, and the phase shift is used to determine the rotational direction.

This asynchronous motor suffers the drawback that the signal transmitter cannot be used with a motor having a cylinder rotor and a magnetic brake, since in this case magnetic fields cause a significant interference, and only limited space exists between the short-circuit winding and the end shield.

Other known types of asynchronous motors with a signal transmitter for determining the rotational speed and rotational direction include an encoder disposed on the motor shaft outside the motor. This type of asynchronous motor, however, is more expensive and is large in size.

SUMMARY OF THE INVENTION

It is thus an object of the present invention to provide an improved asynchronous motor, obviating the afore-stated drawbacks.

In particular, it is an object of the present invention to provide an improved asynchronous motor of compact and inexpensive configuration with a cylinder rotor for a drive mechanism, whereby rotational information, such as rotational speed and rotational direction, of the asynchronous motor can be reliably controlled even in the presence of a rear-mounted magnetic brake which generates strong magnetic fields.

These objects, and others which will become apparent hereinafter, are attained in accordance with the present invention by providing a motor housing having a front end face on an output side and a rear end face, a pair of end shields, one of the end shields arranged on the front end face and the other one of the end shields arranged on the rear end face, a motor shaft supported in the motor housing, a short-circuit winding secured on the motor shaft, at least two sensor units arranged sequentially in a rotational direction of the motor near the rear end face of the motor housing, whereby each of the sensor units includes an opto-electronic receiver and a confronting electro-optic transmitter, and a circular rotary disk, mounted on the motor shaft between the short-circuit winding and the end shield on the rear end face, for interaction with the sensor units, with the rotary disk having modulation elements arranged about the outer circumference of the rotary disk for modulating an intensity of optical output signals produced by the electro-optic transmitter when the modulation elements pass by the respective sensor unit, with the associated receiver transforming the modulated intensity of the optical output signals for formation of at least one electric motor control signal.

Suitably, the modulation elements are arranged on the circular rotary disk which is secured in fixed rotative engagement on the motor shaft between the short-circuit winding and the rear end shield. As a consequence of their optical components, the sensor units are, to a large extent, insensitive to magnetic fields, in particular to the magnetic fields produced by the short-circuit winding and the magnetic brake, while at the same time, the motor can be made very compact.

According to another feature of the present invention, the modulation elements may be opaque to optical radiation so as to momentarily interrupt the light flux when the modulation elements pass by the respective sensor unit. This results in a trouble-free configuration of the sensor units while producing a greatest possible change in the sensor signal.

According to still another feature of the present invention, the modulation elements may be formed as teeth which are evenly spaced about the outer circumference of the rotary disk and extend in a common direction parallel to the motor shaft. In this manner, the modulation elements require little space and are easy to manufacture. Suitably, the direction of rotation can be reliably determined by separating the two neighboring sensor units at a distance which is approximately 1.5 times the width of a tooth.

According to yet another feature of the present invention, an additional sensor unit is provided, which is disposed offset relative to the other two sensor units in the longitudinal direction of the motor shaft. In this manner, the electronic circuit system of the asynchronous motor can be simplified, and the provision of the additional sensor unit allows to generate, separate from the rotational direction signal, a rotational speed signal in the form of a narrow pulse that can be easily evaluated.

A simple rotational speed signal may be produced by lengthening one of the teeth in a direction parallel to the motor shaft, so that the extended tooth modulates the optical radiation of the offset sensor unit.

A versatile and compact asynchronous motor can be constructed by positioning the magnetic brake at the rear end shield.

BRIEF DESCRIPTION OF THE DRAWINGS

The above and other objects, features and advantages of the present invention will now be described in more detail with reference to the accompanying drawing, in which.

DETAILED DESCRIPTION OF PREFERRED EMBODIMENTS

Figure 1:
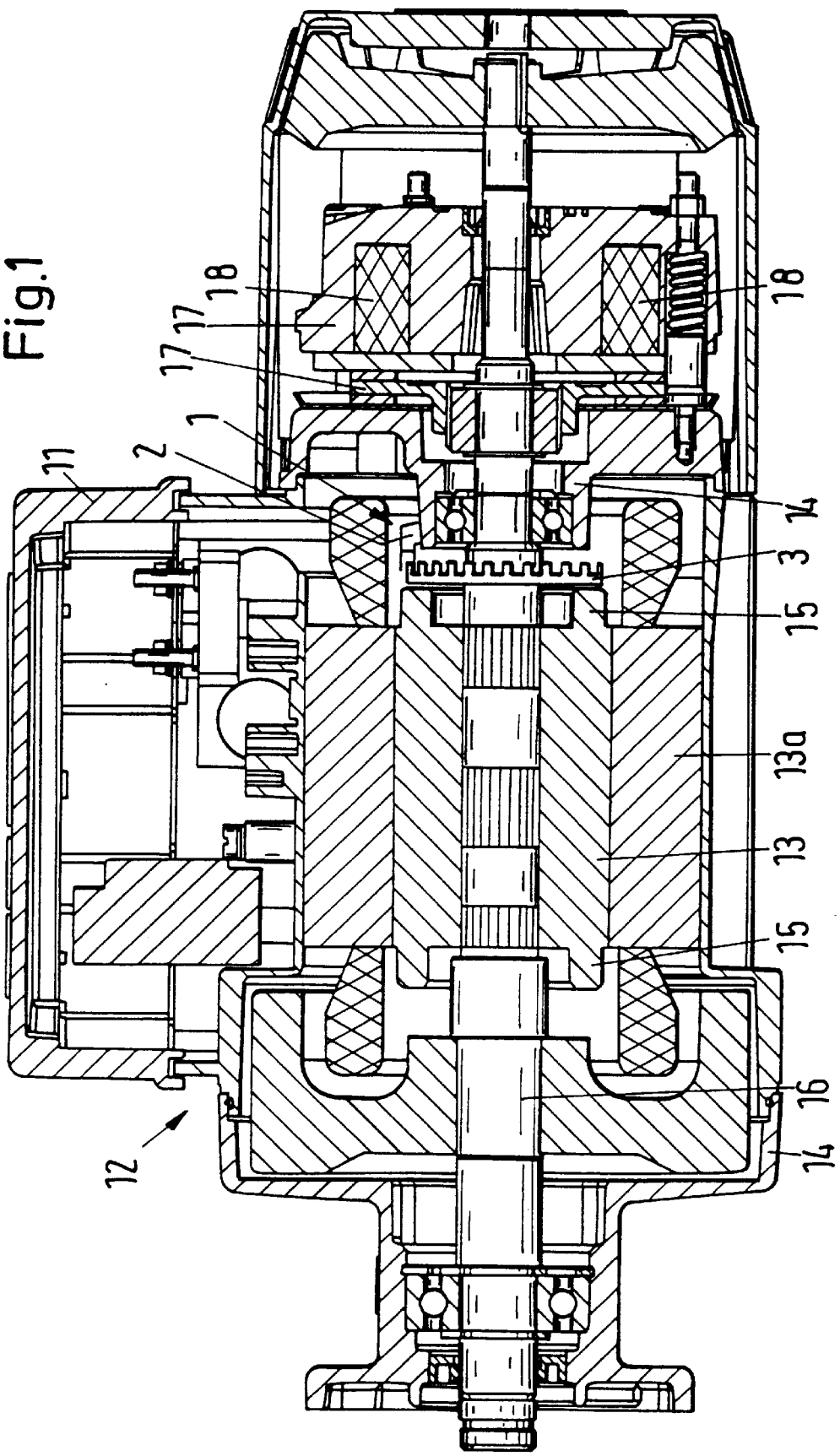
FIG. 1 is a cross-sectional view of one embodiment of an asynchronous motor according to the invention with a rotational speed and rotational direction control.

Throughout all the Figures, same or corresponding elements are generally indicated by same reference numerals.

Turning now to the drawing, and in particular to FIG. 1, there is shown a cross-sectional view of one embodiment of an asynchronous motor according to the present invention, generally designated by reference numeral 12 and having a cylinder rotor 13 and a stator 13a for use in a drive mechanism. The asynchronous motor 12 includes a motor housing 11 having opposite front and rearward end faces, with each end face of the motor housing 11 covered by an end shield 14. Set within the housing 11 is a motor shaft 16, with a short-circuit winding in form of a short-circuit ring 15 being secured on the motor shaft 16. A signal transmitter 1 is disposed completely inside the motor housing 11 immediately adjacent the short-circuit ring 15. Positioned adjacent the rearward end shield 14 is a magnetic brake 17 which is of a type used typically with asynchronous motors 12 having cylinder rotors 13, and includes a coil 18.

Based on the output signals of the signal transmitter 1, rotational information, such as the rotational speed and the rotational direction, of the asynchronous motor 12 can be electronically controlled, for example with a control device (not shown).

Figure 2:
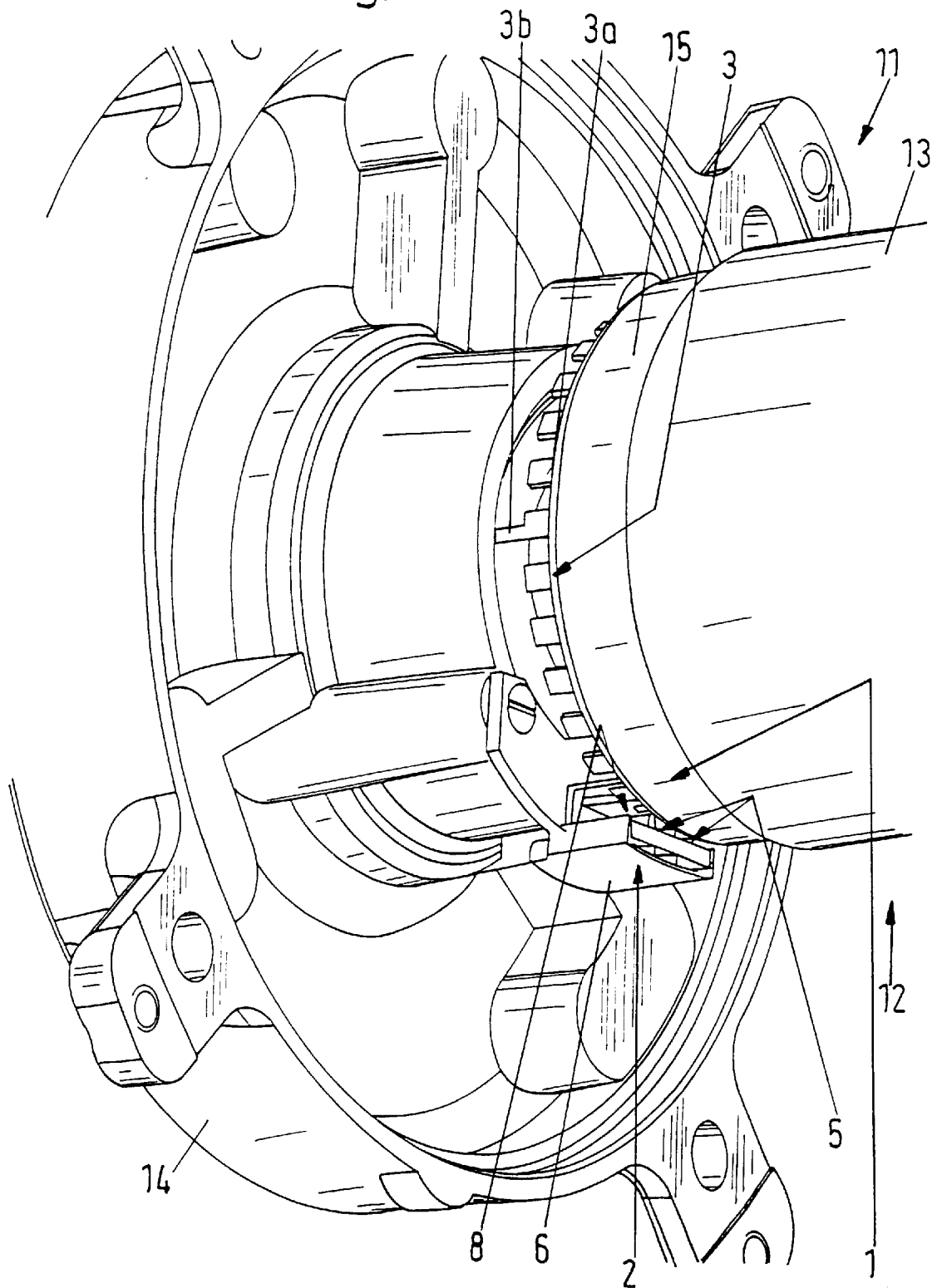
FIG. 2 is a cutaway view, in perspective illustration, of an opened motor housing of the asynchronous motor.

FIG. 2 shows a cutaway view, in perspective illustration, of the open motor housing 11 with the asynchronous motor 12, viewed in a direction towards the rear end shield 14 positioned opposite to the output side. The signal transmitter 1 includes a signal unit, generally designated by reference numeral 2 and a rotary disk, generally designated by reference numeral 3. The rotary disk 3 is fixedly secured inside the motor housing 11 on the motor shaft 16 in the region of the signal transmitter 1, so as to rotate together with the motor shaft 16 about a common axis. The signal unit 2 is attached to the end shield 14 of the motor housing 11, and includes three sensor units 5 mounted in a common housing 6.

Figure 3:
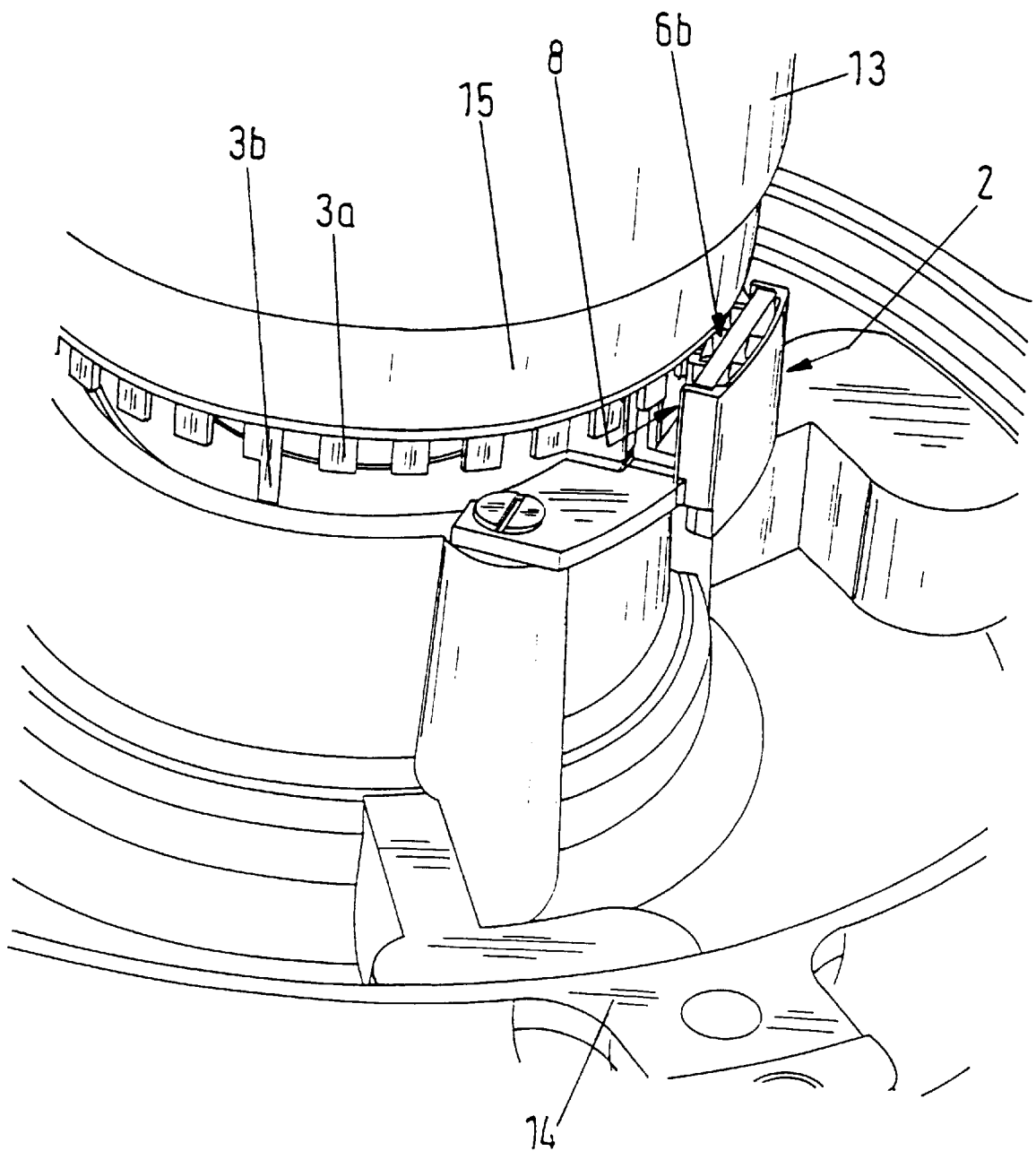
FIG. 3 is another perspective view of the asynchronous motor of FIG. 2 with signal transmitter.

As shown in FIG. 2, an array of modulation elements 3a in the form of teeth of uniform width and length is arranged about the circular edge of the rotary disk 3. The modulation elements 3a are opaque to optical radiation and are evenly spaced from the center of the rotary disk 3 in the radial direction, whereby one modulation element 3a is extended by a modulation element 3b of half the width of the associated modulation element 3a. The modulation elements 3a extend in a common direction in parallel relationship to the motor shaft 16, thereby establishing a comb-shaped annular ring having recesses which open to one side. In FIG. 3, the signal transmitter 1 is shown from a different perspective.

Figure 4:
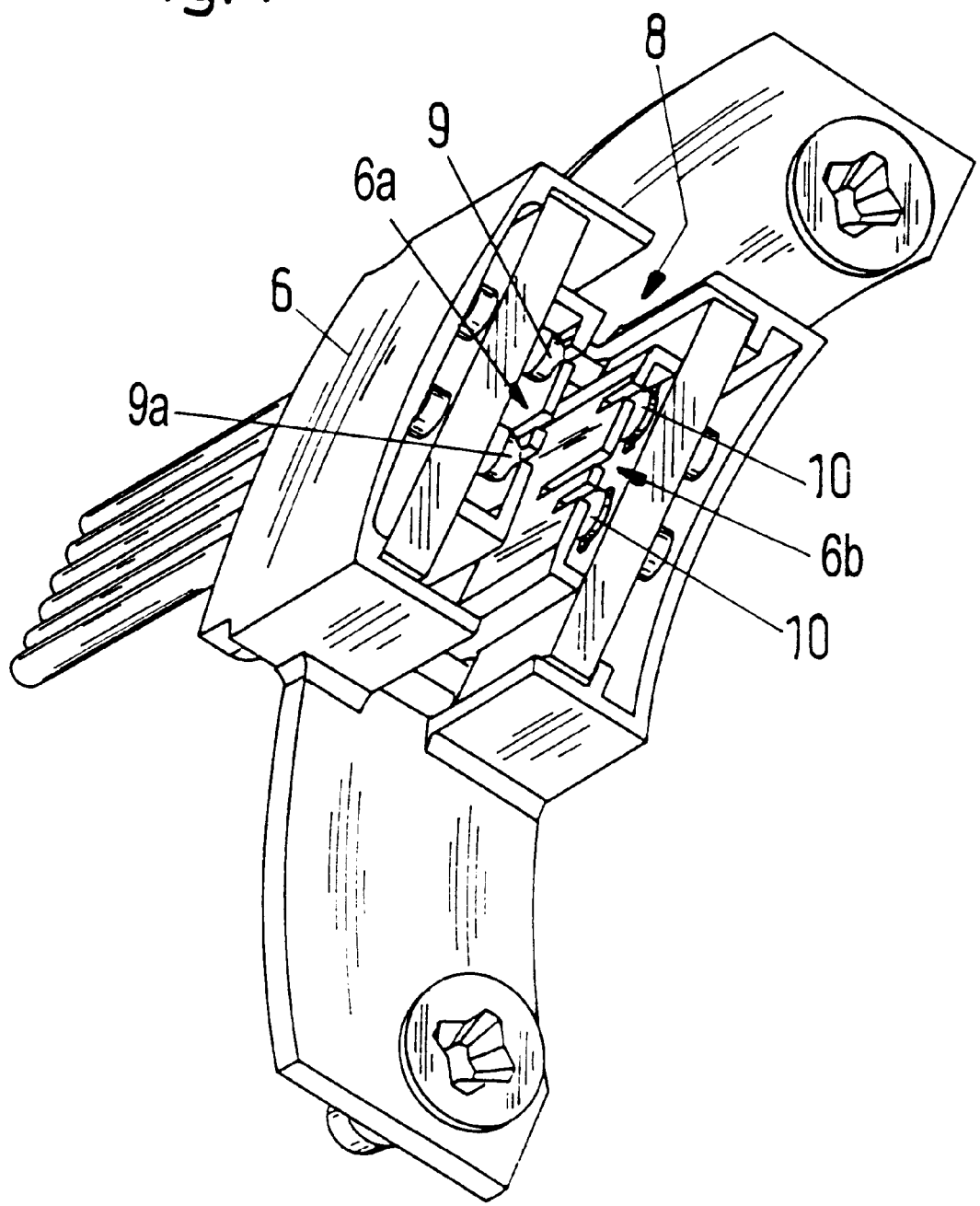
FIG. 4 is a perspective view of the signal transmitter with three sensor units.
Figure 5:
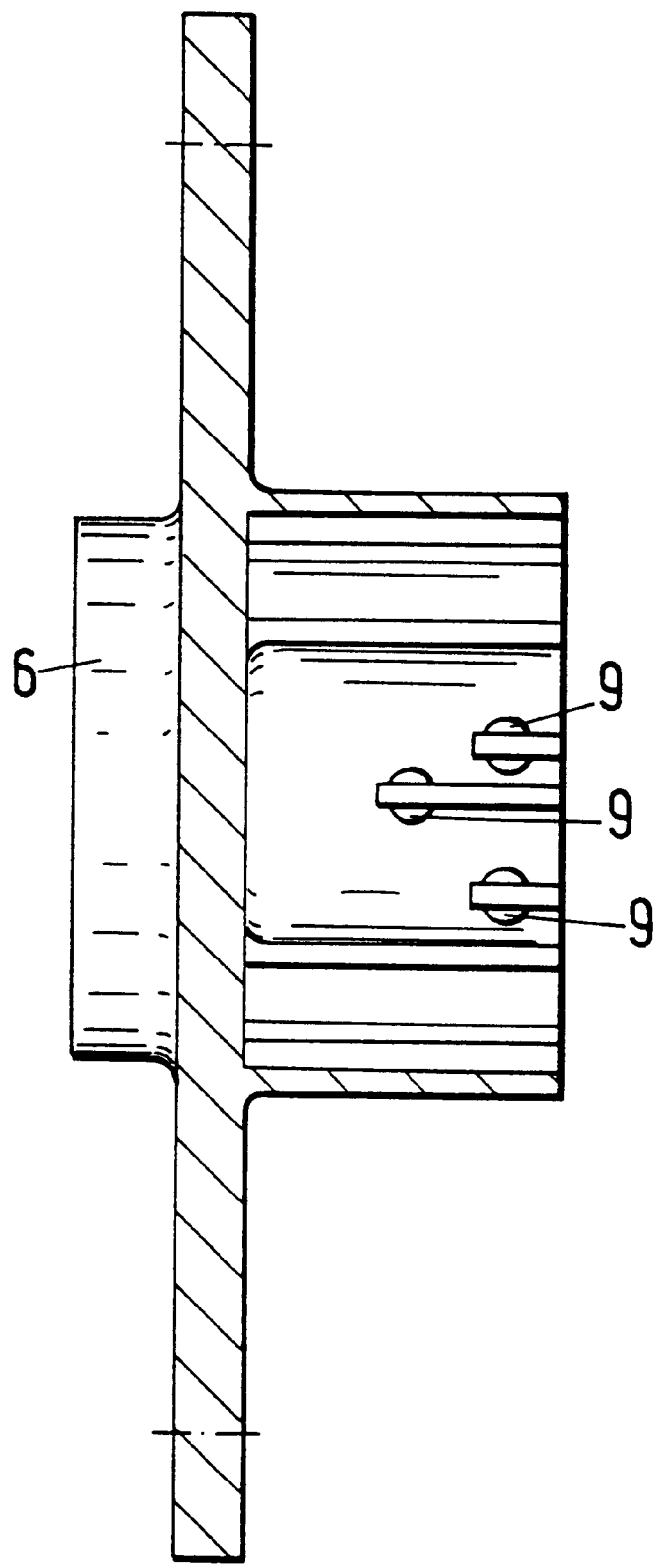
FIG. 5 is a cross-sectional view through the housing of the signal transmitter of FIG. 4.

Referring now to FIG. 4, there is shown a perspective view of the signal transmitter 1. The housing 6 includes two compartments 6a, 6b in parallel disposition at formation of a gap 8 therebetween. Disposed in a first plane in the compartment 6b (the lower compartment in FIG. 4) are electro-optical transmitters 10 which may be implemented as infrared luminescence diodes, and are opposed by opto-electronic receivers 9 positioned in a second plane. The first plane and the second plane extend parallel to one another, with the transmitters 10 facing the receivers 9 in one-to-one correspondence. The transmitter 10 and the receiver 9 of each sensor unit 5 are aligned along a straight line extending perpendicular to the first and second planes. As best seen in FIG. 5, the central sensor unit 5, comprised of transmitter 10 and receiver 9, is offset towards the rear with respect to the two other sensor units 5.

When operating the motor 12, the teeth of the rotary disk 3 engage in the gap 8 between the compartments 6a, 6b and pass successively by the sensor units 5 so as to briefly interrupt the individual light beams, as emanating from the transmitters 10.

The two sensor units 5 which are located towards the front—as viewed in the rotational direction—are spaced apart from each other by a distance that is approximately equal to 1.5 times the width of a tooth (modulating element 3a). The sensor unit 5 that is offset towards the rear, is interrupted only by the one modulation element 3a which is extended by the modulation element 3b (cf. FIG. 2). Alternatively, this tooth configuration may also be shorter compared to the other modulation elements 3a while providing the same functionality, i.e. generation of a narrow electric pulse which allows an exact determination of the rotational speed of the motor 12. The transmitter 10 and the receiver 9 of each sensor unit 5 are connected in a manner known per se to an electronic circuit (not shown), which evaluates the signals received from the receivers 9 to determine the rotational direction and the rotational speed and to thereby enable generation of a motor control signal and/or display of the rotational direction and the rotational speed on a display.

The modulation elements 3a, 3b may also be transparent to the light. For example, an annulus formed of a transparent material may be provided on the rotary disk 3, wherein the light transmission of the annulus changes periodically along the rotational direction of the rotary disk 3. The light transmission may change, for example, with a period that is twice the width of a tooth.

While the invention has been illustrated and described as embodied in an asynchronous motor for a drive mechanism, such as hoists or running gears, with controllable rotational speed and rotational direction, the invention is not intended to be limited to the details shown since various modifications and structural changes may be made without departing in any way from the spirit of the present invention.

What is claimed as new and desired to be protected by Letters Patent is set forth in the appended claims:

1. An asynchronous motor for a drive mechanism comprising:

a motor housing having a front end face on an output side and a rear end face;

a pair of end shields, one of the end shields arranged on the front end face and the other one of the end shields arranged on the rear end face;

a motor shaft supported in the motor housing;

a short-circuit winding supported on the motor shaft;

at least two sensor units arranged sequentially in a rotational direction of the motor at a rear side distant to the output side, each of the sensor units including an opto-electronic receiver and an opposing electro-optic transmitter;

a circular rotary disk, mounted on the motor shaft between the short-circuit winding and the end shield on the rear end face, for interaction with the sensor units, said rotary disk defining an outer circumference and having modulation elements arranged about the outer circumference of the rotary disk for modulating an intensity of optical output signals produced by the electro-optic transmitter when the modulation elements pass by the respective sensor unit, with the receiver transforming the modulated intensity of the optical output signals for formation of at least one electric motor control signal; and a third sensor unit which is offset relative to the at least two sensor units in a longitudinal direction of the motor shaft.

2. The asynchronous motor of claim 1, wherein the modulation elements are opaque to optical radiation so as to interrupt a light beam when the modulation elements pass the sensor units.

3. The asynchronous motor of claim 1, wherein the modulation elements are configured in the form of teeth which are evenly spaced about the outer circumference of the rotary disk and extend in a common direction parallel to the motor shaft.

4. The asynchronous motor of claim 3, wherein the sensor units are spaced in the direction of rotation from one another at a distance which is approximately 1.5 times a width of a tooth.

5. The asynchronous motor of claim 1, wherein the modulation elements are configured in the form of teeth, with one of the tooth-shaped modulation element being so extended in length as to modulate an optical radiation of the third sensor unit.

6. The asynchronous motor of claim 1, and further comprising a magnetic brake arranged on the end shield at the rear end face.

7. An asynchronous motor for a drive mechanism, comprising:

a motor housing having a front end face on an output side and a rear end face;

a pair of end shields, one of the end shields arranged on the front end face and the other one of the end shields arranged on the rear end face;

a motor shaft supported in the motor housing;

a short-circuit winding supported on the motor shaft;

at least two sensor units arranged sequentially in a rotational direction of the motor at a rear side distant to the output side, each of the sensor units including an opto-electronic receiver and an opposing electro-optic transmitter; and a circular rotary disk, mounted on the motor shaft between the short-circuit winding and the end shield on the rear end face, for interaction with the sensor units, said rotary disk defining an outer circumference and having modulation elements arranged about the outer circumference of the rotary disk for modulating an intensity of optical output signals produced by the electro-optic transmitter when the modulation elements pass by the respective sensor unit, with the receiver transforming the modulated intensity of the optical output signals for formation of at least one electric motor control signal, wherein the sensor units are spaced in the direction of rotation from one another at a distance which is approximately 1.5 times a width of a tooth.

8. The asynchronous motor of claim 7, wherein the modulation elements are opaque to optical radiation so as to interrupt a light beam when the modulation elements pass the sensor units.

9. The asynchronous motor of claim 7, wherein the modulation elements are configured in the form of teeth which are evenly spaced about the outer circumference of the rotary disk and extend in a common direction parallel to the motor shaft.

10. The asynchronous motor of claim 7, wherein the modulation elements are configured in the form of teeth, with one of the tooth-shaped modulation element being so extended in length as to modulate an optical radiation of the third sensor unit.

11. The asynchronous motor of claim 7, and further comprising a magnetic brake arranged on the end shield at the rear end face.

12. An asynchronous motor, comprising:

a motor housing;

a motor shaft supported in the motor housing;

at least two sensor units arranged sequentially in a rotation direction of the motor, each of the sensor units including an electro-optic emitter and an opposing opto-electronic receiver which receives radiation emitted by the electro-optic emitter;

a circular rotary disk mounted on the motor shaft and having modulation elements arranged about an outer circumference of the rotary disk, said modulation elements being in the form of evenly spaced teeth and extending in a common direction parallel to the motor shaft for modulating the emitted radiation; and a third sensor unit which is offset relative to the at least two sensor units in a longitudinal direction of the motor shaft.

13. The asynchronous motor of claim 12, wherein the modulation elements are opaque to optical radiation so as to interrupt a light beam when the modulation elements pass the sensor units.

14. The asynchronous motor of claim 12, wherein the modulation elements are configured in the form of teeth which are evenly spaced about the outer circumference of the rotary disk and extend in a common direction parallel to the motor shaft.

15. The asynchronous motor of claim 12, wherein the sensor units are spaced in the rotation direction from one another at a distance which is approximately 1.5 times a width of a tooth.

16. The asynchronous motor of claim 12, wherein the modulation elements are configured in the form of teeth, with one of the tooth-shaped modulation element being so extended in length as to modulate an optical radiation of the third sensor unit.

17. The asynchronous motor of claim 12, and further comprising a magnetic brake arranged on the end shield at the rear end face.

* * * * *